Figure 1:
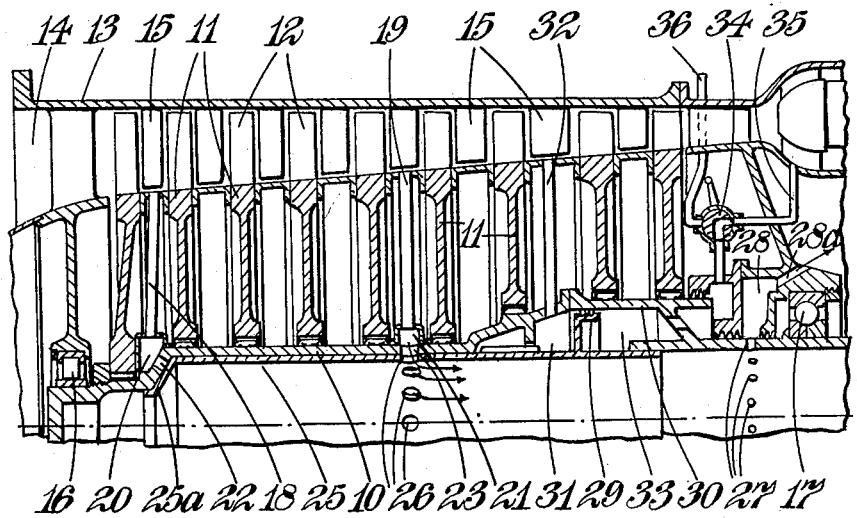

April 24, 1962 D. O. DAVIES 3,031,132
GAS-TURBINE ENGINE WITH AIR TAPPING MEANS
Filed Dec. 2, 1957 3 Sheets-Sheet 1

INVENTOR
DAVID OMRI DAVIES
BY MacKinney & MacKinney

United States Patent Office 3,031,132
Patented Apr. 24, 1962

3,031,132
GAS-TURBINE ENGINE WITH AIR TAPPING MEANS

David Omri Davies, Kingsway, Derby, England, assignor to Rolls-Royce Limited, Derby, England, a British company
Filed Dec. 2, 1957, Ser. No. 700,162
Claims priority, application Great Britain Dec. 19, 1956
10 Claims. (Cl. 230—209)

This invention relates to gas-turbine engines. In such engines it is known to utilise air compressed in a compressor system of the engine for cooling purposes or for sealing purposes in the engine, or for both these purposes.

It will be appreciated that the abstraction of air from a compressor system of the engine reduces the overall efficiency of the engine, power having been supplied to the compressor system to compress the air thus abstracted. It is the primary object of the present invention to provide a gas-turbine engine in which provision is made for tapping off air for such purposes from a compressor system of the engine in a manner permitting under some operating conditions at least a reduction in the loss associated with the tapping of such air.

According to the present invention a gas-turbine engine has provision for abstracting air which is to be used in the engine for cooling or sealing purposes, from a plurality of pressure locations in a compressor system of the engine, and control means is provided for selecting the location at which such air is abstracted.

The invention has an important application to gas-turbine engines designed for aircraft propulsion, and in such application there may be provided two tapping locations on a compressor system, one such location being in the region of relatively low pressure and the second in a region of relatively high pressure.

Aircraft gas-turbine engines are normally installed in such a manner that the air intake of the compressor is pressurised due to the forward flight speed of the aircraft. The pressure rise in the air intake is accompanied by a temperature rise which in the case of a high-speed aircraft may be substantial; for example, in the case of an aircraft flying at 1000 miles per hour, the temperature rise is of the order of 100° C.

By adoption of the invention in connection with aircraft gas-turbine engines, two distinct advantages arise, one more particularly related to engines installed in low-speed aircraft, e.g. those having a flight speed less than the speed of sound and the second in relation to engines installed in high-speed aircraft, e.g. those flying at speeds in excess of speed of sound. In the case of the low-speed aircraft the invention permits economy in the use of air tapped from the compressor system of the engine, in that under flight conditions a low pressure region of the compressor may be employed as a pressure source of cooling or sealing air whilst under ground-running conditions, under full power take-off and climb conditions of the engine a high-pressure region may be employed. In the case of the high-speed aircraft, the invention has the additional advantage in that it permits the use of air for cooling or sealing purposes which is at a suitable low temperature. As has been stated above, in the case of an aircraft flying at for example 1000 miles per hour the temperature rise in the intake of the engine will be of the order of 100° C., and consequently air abstracted from the relatively high pressure location in the compressor of the engine supplied with air through the intake may be too hot to be useful for cooling.

The control means for selecting the location at which the air is abstracted from the compressor system of the engine may be manually actuated or may be automatically actuated in accordance with a condition related to an operating variable of the engine itself or an operating variable associated with the flight of the aircraft. Thus for example change-over to abstraction of air through a low-pressure tapping from abstraction through a high-pressure tapping may be effected when the pressure at said high-pressure tapping reaches a predetermined value.

It is known for instance from British patent specification No. 622,181 (Rolls-Royce Limited) to tap air from a compressor system of a gas-turbine engine and to deliver the air into a hollow shaft of the engine to be conveyed through the shaft to the point or points of utilisation of the air for cooling or sealing purposes. In the specification referred to the air is tapped off from the compressor rotor structure into the main compressor shaft. A gas-turbine engine having air tapping means as above set forth will be referred to as "a gas-turbine engine as specified."

Thus in accordance with another aspect of the present invention a gas-turbine engine as specified comprises valve means for selecting one of a plurality of tappings through which air flows from the compressor system into the main compressor shaft. Such valve means may comprise a sleeve element within the main compressor shaft movable axially thereof to select the appropriate pressure tapping.

Alternatively, the pressure tappings may be connected to a changeover valve operable to select the appropriate tapping. Preferably in this case the tappings are externally of the compressor casing and the selected tapped air is conducted from the selector valve across the working fluid duct of the engine into the central shaft.

Figure 2:
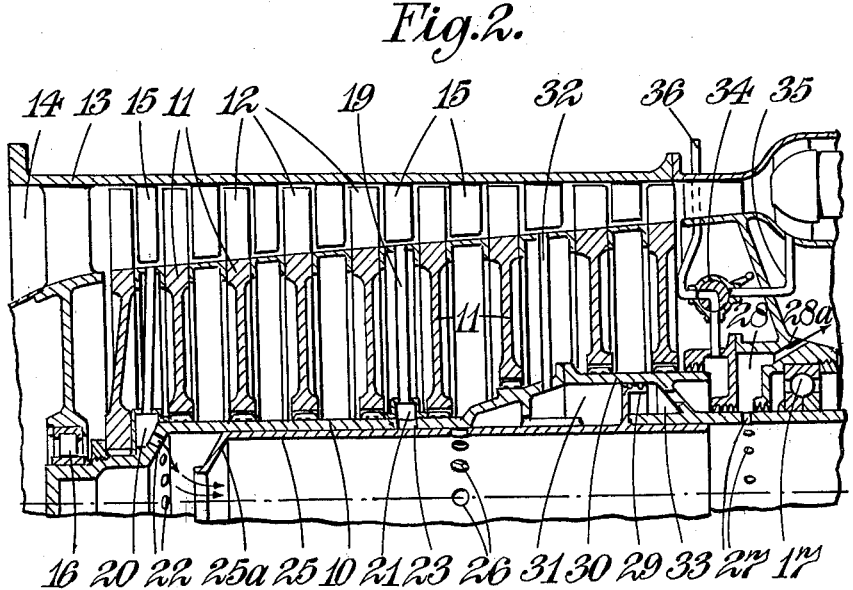
Figure 3:
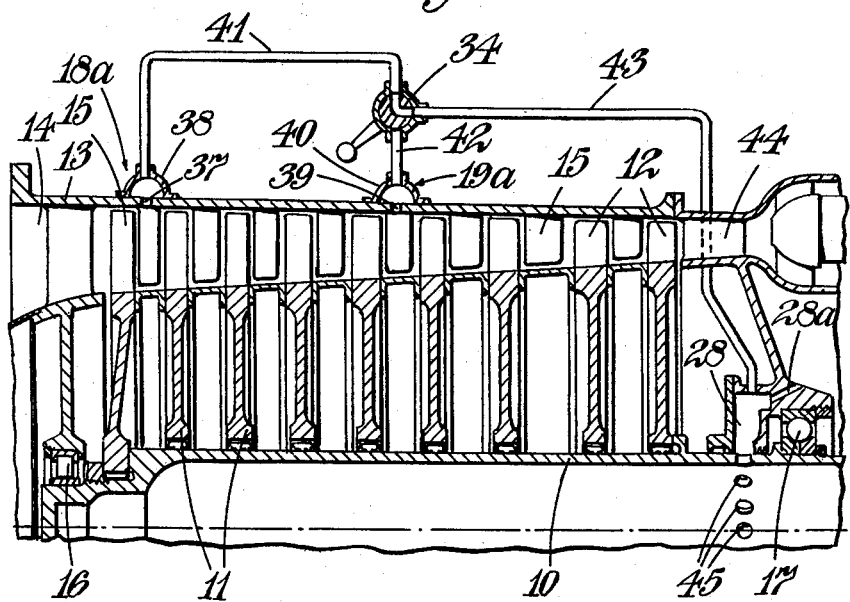
Figure 4:
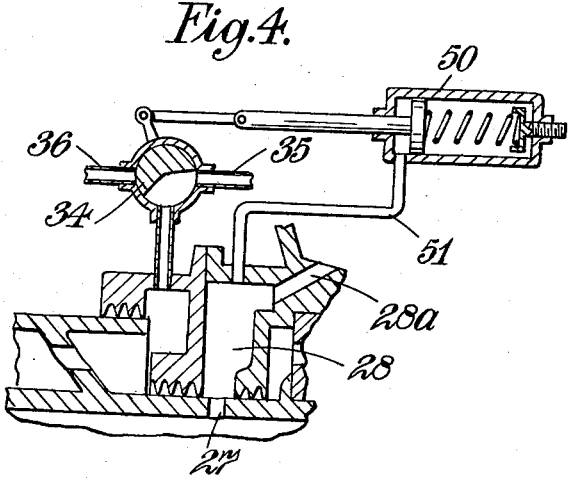
Figure 5:
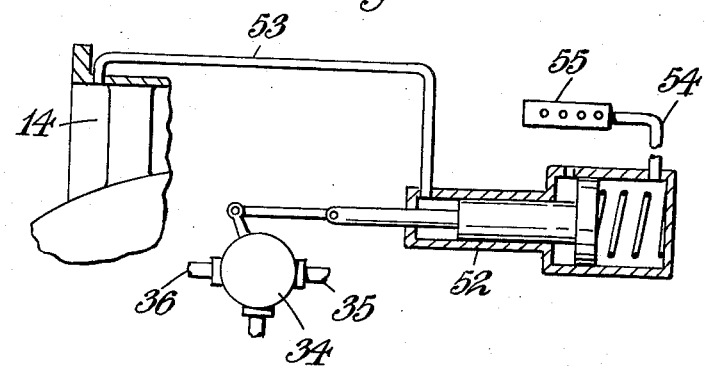
Figure 6:
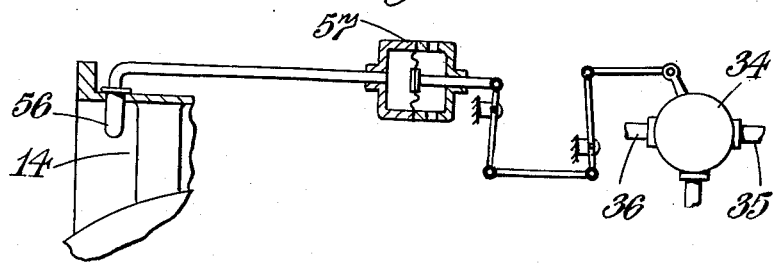

Two embodiments of the invention in accordance with the above aspect threof are illustrated in the accompanying drawings, in which:

FIGURE 1 is a sectional view of part of an axial-flow compressor showing a valve element within the main compressor shaft positioned so that air tapping is effective from a first location in the compressor;

FIGURE 2 is a view similar to that of FIGURE 1 but showing air tapping effective from a second location in the compressor; and FIGURE 3 is a view corresponding to FIGURE 1 but showing the tappings made externally of the compressor, the air therefrom being conducted across the working fluid duct of the engine into the central shaft, and FIGURES 4 through 6 show forms of control for the valve element of FIGURES 1 to 3.

Referring to the figures, the axial-flow compressor has a rotor structure comprising a main rotor shaft 10 of hollow form supporting a series of rotor discs 11 each having at its periphery a ring of rotor blading 12. The compressor has a stator structure including a casing 13 providing an air intake 14 at one end and supporting rows of stator blading 15. Bearings 16 and 17 support the rotor shaft 10 in the stator structure.

Two cooling and sealing air tappings are made from the working fluid passage of the compressor so that air can flow through the rotor structure towards the shaft 10. The tappings are indicated at 18 and 19, the tapping at 18 being at a location of relatively low pressure, and the tapping at 19 being at a location of relatively high pressure. These tappings 18 and 19 may comprise structure as described in British patent specification No. 712,051 (Rolls-Royce Limited), and at the radially inner ends of such structure annular chambers 20 and 21 are provided which form manifolds communicating with the interior of the main compressor shaft 10 through ports 22 and 23 respectively, the ports being holes drilled in the shaft 10.

A cylindrical valve element 25 is provided within the shaft 10 and is axially slidable therein. When the valve element 25 is in the position illustrated in FIGURE 1, the ports 23 are in register with ports 26 in the valve element whereby air can flow from the chamber 21 into the interior of the shaft. In this position, a radially-inwardly-extending flange portion 25a of the valve element 25 abuts against a correspondingly-shaped shoulder in the shaft to close off the ports 22.

In the position of the valve element 25 shown in FIGURE 2, the ports 26 are out of register with ports 23 whereby communication between the chamber 21 and the interior of the shaft is blanked off and the radially-inwardly-extending flange portion 25a of the valve element 25 is withdrawn from against the shoulder so uncovering the ports 22 whereby air can flow from the chamber 20 into the interior of the shaft 10.

It will be noted that the air flowing in the shaft 10 is permitted to pass therefrom through the ports 27 to pressurise the chamber 28 adjacent the bearing 17. In this manner the bearing is cooled and/or sealed against the inward flow of hot air. A port 28a is provided from chamber 28 to permit flow of cooling air around the bearing 17 and between the shaft 10 and combustion equipment.

The valve element 25 is moved axially by pneumatic ram means comprising a piston 29 formed by a flange on the valve element 25, the piston 29 co-operating with a cylindrical portion 30 of the shaft 30, the shaft being enlarged in the region of the cylindrical portion 30 to accommodate the piston 29.

The piston 29 is moved in the cylinder 30 by pressure air. The pressure air is supplied as follows. A chamber 31 to the left-hand side of the piston 29 is permanently in communication through a tapping 32 with a relatively high-pressure location in the working fluid passage of the compressor. A chamber 33 to the right-hand side of the piston 29 is arranged to be placed in communication through a selector valve 34 either with a high-pressure location 35 in the combustion chamber of the engine or with an atmospheric pressure location 36. When the valve is in the position shown in FIGURE 1, the air in the chamber 33 is at a pressure which is in excess of the pressure in the chamber 31, and thus the valve element 25 is held in its left-hand position. When the selector valve 34 is in the position shown in FIGURE 2, the air in chamber 33 is at substantially atmospheric pressure so that the valve element 25 is held in its right-hand position.

In FIGURE 3 the same numerals are used for parts corresponding to those in FIGURES 1 and 2.

Two cooling and sealing air tappings are made from the working fluid passage of the compressor at the same axial locations as in the previous embodiment but from the outer periphery thereof, tapping 18a corresponding to tapping 18 and tapping 19a corresponding to tapping 19 in FIGURES 1 and 2. The tapping 18a comprises a ring of ports 37 around the outer casing of the compressor, the ports being surrounded by an annular manifold 38 and similarly the tapping 19a comprises ports 39 and manifold 40. Manifolds 38 and 40 are connected to selector valve 34 by pipes 41 and 42 respectively and pipe 43 conveys air from the valve 34 to the chamber 28 formed between the air seals surrounding and co-operating with the shaft 10, the pipe 43 passing through a hollow guide vane 44 at the outlet of the compressor. Ports 45 are formed in the shaft 10 to admit the air from chamber 38. As in the previous embodiment a port 28a is formed in the wall of chamber 28.

The selector valve 34 may be operated manually or automatically in accordance with an operating variable of the engine or of an aircraft in which the engine is installed. Thus for example a pressure-responsive device 50 may be provided (FIGURE 4) which is subjected through pipe 51, chamber 28 and ports 27 to the pressure within the main compressor shaft 10 and is arranged, on sensing of an increase of pressure within the shaft 10 above a preselected value, to cause actuation of the selector valve 34 in a manner to cause the valve element 25 to be adjusted to the position shown in FIGURE 2. Alternatively as shown in FIGURE 5 a pressure-responsive device 52 may be connected through pipes 53, 54 to respond to the ratio of the pressure in the air intake 14 of the compressor to the static pressure of the ambient air sensed by static pressure probe 55, which ratio increases as the speed of flight increases and the pressure-sensitive device may be arranged at a preselected value of the ratio to actuate the valve element 25 in the desired sense. In yet another alternative (FIGURE 6) the selector valve 34 may be actuated by temperature-sensitive means 56, 57 on sensing a predetermined air temperature in the air intake 14, or on sensing of a predetermined temperature of the abstracted air.

I claim:

1. A multi-stage axial-flow compressor, said compressor including a rotor having a hollow rotor shaft and rotor-blade-carrying structure mounted on the shaft, said rotor-blade-carrying structure including a plurality of tapping structures permitting air compressed in the compressor to be abstracted from a plurality of axially-spaced pressure locations and to flow inwards through the rotor towards the shaft, porting in the length of the shaft corresponding to each tapping structure and placing the interior of the shaft in communication with the respective tapping structure, an adjustable valve adapted according to its position of adjustment to uncover the porting corresponding to one tapping structure and to cover the remaining portion thereby to determine the tapping structure through which air is to be fed into the shaft, and control means connected to operate the valve and operable to permit selection of the tapping structure through which air is fed to the shaft.

2. A compressor according to claim 1, wherein said valve comprises a sleeve valve member axially-slidable within the hollow rotor shaft and co-operating with the porting and operating means effecting sliding of the sleeve valve member selectively to uncover the porting.

3. A compressor according to claim 2 wherein said operating means comprises a ram including a piston element integral with the sleeve valve and a cylinder in which the piston moves, formed by a portion of the hollow shaft, and the control means includes selector valve means controlling operation of the ram.

4. A compressor according to claim 3, wherein said cylinder comprises on one side of the piston a first chamber connected in permanent communication with a pressure region at a first pressure, and on the other side of the piston a second chamber connectible through said selector valve means selectively to a second pressure region at a second pressure higher than said first pressure and to a region of substantially atmospheric pressure.

5. A compressor according to claim 3, comprising manual means connected to actuate said selector valve means.

6. A compressor according to claim 3, comprising means responsive to an operating variable of the compressor and operative to adjust the selector valve means at a preselected value of the variable.

7. A compressor according to claim 3, comprising pressure-responsive means responsive to the pressure within the hollow shaft and operative at a selected value of the pressure to adjust the selector valve means.

8. A compressor according to claim 3, comprising pressure-ratio-responsive means responsive to the ratio of the pressure in the air intake to the static pressure of the ambient air and operative at a selected value of the ratio to adjust the selector valve means.

9. A compressor according to claim 3, comprising temperature-sensitive means responsive to air temperature within the air intake and connected to adjust the selector valve means on sensing a predetermined value of the temperature.

10. A compressor according to claim 3, comprising temperature-sensitive means responsive to air temperature of the air within the hollow shaft and connected to operate the selector valve means on sensing a predetermined value of the temperature.

References Cited in the file of this patent

UNITED STATES PATENTS

| | | |
|---|---|---|
| 2,418,801 | Baumann | Apr. 8, 1947 |
| 2,599,470 | Meyer | June 3, 1952 |
| 2,749,087 | Blackmann et al. | June 5, 1956 |
| 2,837,270 | Chapman | June 3, 1958 |
| 2,863,288 | Martin | Dec. 9, 1958 |

FOREIGN PATENTS

| | | |
|---|---|---|
| 201,508 | Australia | Apr. 18, 1956 |
| 586,710 | Great Britain | Mar. 28, 1947 |
| 595,351 | Great Britain | Dec. 3, 1947 |
| 1,059,967 | France | Nov. 18, 1953 |
| 1,090,733 | France | Apr. 4, 1955 |